US005615317A

United States Patent [19]

Freitag

[11] Patent Number: 5,615,317
[45] Date of Patent: Mar. 25, 1997

[54] METHOD FOR BLENDING EDGES OF A GEOMETRIC OBJECT IN A COMPUTER-AIDED DESIGN SYSTEM

[75] Inventor: Stefan Freitag, Nufringen, Germany

[73] Assignee: Hewlett-Packard Company, Palo Alto, Calif.

[21] Appl. No.: 658,914

[22] Filed: May 31, 1996

Related U.S. Application Data

[63] Continuation of Ser. No. 280,808, Jul. 26, 1994, abandoned.

[30] Foreign Application Priority Data

Oct. 11, 1993 [EP] European Pat. Off. .............. 93116433

[51] Int. Cl.[6] .................................................. G06T 17/00
[52] U.S. Cl. .......................... 395/119; 395/120; 395/134; 364/474.24; 364/474.29
[58] Field of Search .................................... 395/119, 120, 395/121, 125, 133, 134, 141, 142; 364/474.22–474.29

[56] References Cited

U.S. PATENT DOCUMENTS

| | | | |
|---|---|---|---|
| 5,010,502 | 4/1991 | Diebel et al. ........................... | 395/119 |
| 5,101,363 | 3/1992 | Rutkowski ............................. | 364/578 |
| 5,113,490 | 5/1992 | Winget .................................. | 365/119 |
| 5,251,160 | 10/1993 | Rockwood et al. .................... | 364/578 |
| 5,341,461 | 8/1994 | Kikuchi et al. ........................ | 395/120 |
| 5,388,199 | 2/1995 | Kakazu et al. ......................... | 395/155 |

OTHER PUBLICATIONS

Sanglikar et al.; *Parametric Blends for Shape Modelling*; 1989; pp. 377–381.
Radack et al.; *Positioning Features Within the Rapid Design System*; 1991; pp. 38–41.
European Search Report.
Computer Aided Design, Rounding Facility For Solid Modelling of Mechanical Parts, Holmstrom et al., vol. 20, Dec. 1988, pp. 605–614.
Computer Aided Design, Flexible Rounding Operation for Polyedra, Szilvasi–Nagy, vol. 23, Nov. 1991, pp. 629–633.

*Primary Examiner*—Almis R. Jankus

[57] ABSTRACT

In a method for blending an edge of a geometric object in a computer-aided design (CAD) system, a user can select an edge which is to be blended as well as the size of the blend portion. The size of the blend portion can be selected, for example, by entering a desired blend radius into the CAD system. The CAD system calculates the blended object comprising the blend portion and the remaining parts of the original object. The intersections of the blend surface with the object are calculated and it is determined which edges and faces of the original object are deleted by the blending operation. The method is capable of performing blending operations wherein an arbitrary number of edges and faces are removed from the object. The method can also be used for blending an edge with a variable radius and for chamfering the edge.

6 Claims, 13 Drawing Sheets

METHOD FOR BLENDING EDGES OF A GEOMETRIC OBJECT IN A COMPUTER-AIDED DESIGN SYSTEM

This is a continuation of application Ser. No. 08/280,808 filed on Jul. 26, 1994, now abandoned.

FIELD OF THE INVENTION

The invention relates to a method for blending edges of a geometric object in a computer-aided design (CAD) system. In the design of physical objects, for example machine parts, it is often necessary to blend edges of the object. Blending as hereinafter referred to is a rounding off of the edges or a chamfering of the edges. The present invention deals with the performance of the blending operation in a 3D CAD system which is capable of storing a graphical representation of the physical object and displaying it three-dimensionally (3D) in an isometric view and which allows a user to modify this representation interactively.

BACKGROUND OF THE INVENTION

CAD systems are widely used in the design of mechanical or electronic parts or other objects and there are several commercially available systems of that type. A common characteristic of these systems is that the objects are designed by the user in an interactive mode, that means that the body is displayed on a screen as far as it has been designed by the user and the user can enter commands by means of which additions and modifications of the already existing structure can be made. For displaying the geometric object under design, typically a cathode ray tube (CRT) or a liquid crystal display (LCD) is used. The object is displayed in an isometric view, whereby the displayed object may additionally be illuminated by imaginary (i.e., computer generated) light sources so that the three-dimensional impression is further improved. As an alternative to the perspective representation on the screen, a two-dimensional or cross-sectional view of the object under design can be displayed. Some known CAD systems also allow to rotate the displayed object around different axes so that the user can look at the object from several directions. The commands for supplementing or modifying are entered by suitable input means, preferably a computer mouse, a graphics tablet or a light pen. When the editing process is finished and the object to be designed has assumed its final shape, a corresponding hardcopy can be produced by a printer or plotter. Furthermore, a punched tape or a magnetic tape can be produced from the data representing the object, and this can then can be used directly by a numerically controlled machine tool for manufacturing the desired physical object.

An example for a commercially available 3D CAD system is the Hewlett-Packard PrecisionEngineering SolidDesigner Version 1.0. A description of a 3D CAD system is also known from I. C. Braid: "Notes on a geometric modeller" C A.D. Group Document No. 101, University of Cambridge, June 1979. This prior art document will subsequently be referred to as the Braid reference. A further description of a 3D CAD system is known from the article by I.C. Braid et al.: "Stepwise Construction of Polyhedra in Geometric Modelling", in K. W. Brodlie (Ed.): "Mathematical Methods in Computer Graphics and Design" Academic Press, 1980

In section 4.9 of the Braid reference, a basic discussion of chamfering, the replacement of a straight edge by a small flat face, is given. At the end of the Braid reference, it is stated that the pressing problem of fillets and blends has unfortunately remained unsolved.

In the meantime, several CAD systems have been developed, for example the above mentioned system by Hewlett-Packard, which have the capability to perform blending of edges and, as a special case of blending, chamfering of edges. In the known CAD systems, the user can select an edge which is to be blended by positioning a cursor at this edge using, for example, a computer mouse. When the edge has been selected, the user can enter a radius for the blend curve or, in the case of chamfering, the distance of the chamfer from the original edge. The computer then calculates the shape of the blended or chamfered object and displays it on the screen.

Existing CAD systems, however, are not satisfactory in all respects since they are not able to perform blending for all desirable magnitudes of the blending radius and for all shapes of the represented object. In the practical work with a CAD system, it frequently occurs that the blending of a specific edge would require that other edges or even entire faces of the geometric object are removed. In particular, if the object has many short edges and the blending radius or the chamfer is large, the blending may reach over several edges and faces of the original object and require the removal of such edges and faces from the geometric object. As a simple example, a cube is considered, a vertical edge of which is to be blended. If the blending radius is sufficiently large, a major portion of the cube would be cut away, leaving only a corner piece of the original cube with a cross section corresponding to a sector. In order to generate this corner piece, all edges of the cube which intersect the original edge to be blended, i.e., the four horizontal edges meeting the original edge, have to be removed. Furthermore, the two horizontal faces adjacent the original edge have to be completely removed. In practical design tasks, the objects of interest are more complex than just a cube and the problem of removing edges and faces becomes more complex.

The problem with the present CAD systems is that they are not able to perform the task of removing edges and faces for all possible varieties of the geometry of the object under design and of the blending parameters (blending radius, chamfer). Some CAD systems do have a limited capability of removing individual edges; such edge removal, however, only works for simple geometric objects. With more complex geometric conditions, the CAD system produces an error message on the screen that the blending operation cannot be performed. In any case, applicant is not aware of a CAD system which is able to remove entire faces of the geometric object. Due to these limitations, the selection of the blending radius is severely limited in prior art CAD systems. As a consequence thereof, parts of the geometric model or even the whole model have to be constructed anew, whereby short edges which could lead to the mentioned problems with blending, have to be avoided. This leads to a lengthy design process and is thus costly.

SUMMARY OF THE INVENTION

It is thus an object of the invention to provide a method and a corresponding CAD system which permits blending of selected edges even if edges and/or faces of an arbitrary number have to be removed from the geometric object.

It is a further object of the invention to permit blending with a fixed as well as with a variable blending radius as well as chamfering with arbitrary chamfers.

According to the invention, these objects are achieved by a method as defined in claim 1 and by a CAD system as defined in claim 6. The invention thus provides a method for blending edges of a geometric object in a computer-aided design system, comprising the steps of:

a) selecting an edge to blend, said edge having a start vertex, and an end vertex, b) selecting a blend surface, c) calculating blend boundaries, d) calculating intersections of the blend boundaries with edges of the geometric object connected to the start vertex or to the end vertex, e) deleting edges for which step d) does not provide an intersection and repeating step d) with a new edge which has been created by the deletion and which is connected to the start vertex or to the end vertex, f) calculating the blend surface, g) calculating intersections of the blend surface with the edges which are connected to the start vertex or to the end vertex and which have not yet been intersected in a previous step, h) inserting between the intersections calculated in the previous steps, the corresponding portion of the blend surface, and i) displaying the resulting geometric object.

The blending method according to the invention can be used with any geometry of the geometric object under design, whatever complex it may be. Unlike with prior art CAD systems, there are no limitations regarding edges which have to be deleted when the blending operation is to be performed. With the invention, edges can be removed in any necessary number. The invention even allows to remove entire faces from the object in any necessary number. Furthermore, the method of the invention can be used for any type of blending, like blending with a constant radius (corresponding to a cylinder surface), blending with variable radius, chamfering, or generating fillets. The method of the invention is universal in that it can be applied for all possible geometric objects and shapes of the blend surface.

BRIEF DESCRIPTION OF THE DRAWINGS

In the following, embodiments of the invention will be explained in detail with reference to the drawings.

DETAILED DESCRIPTION OF THE INVENTION

Figure 1:
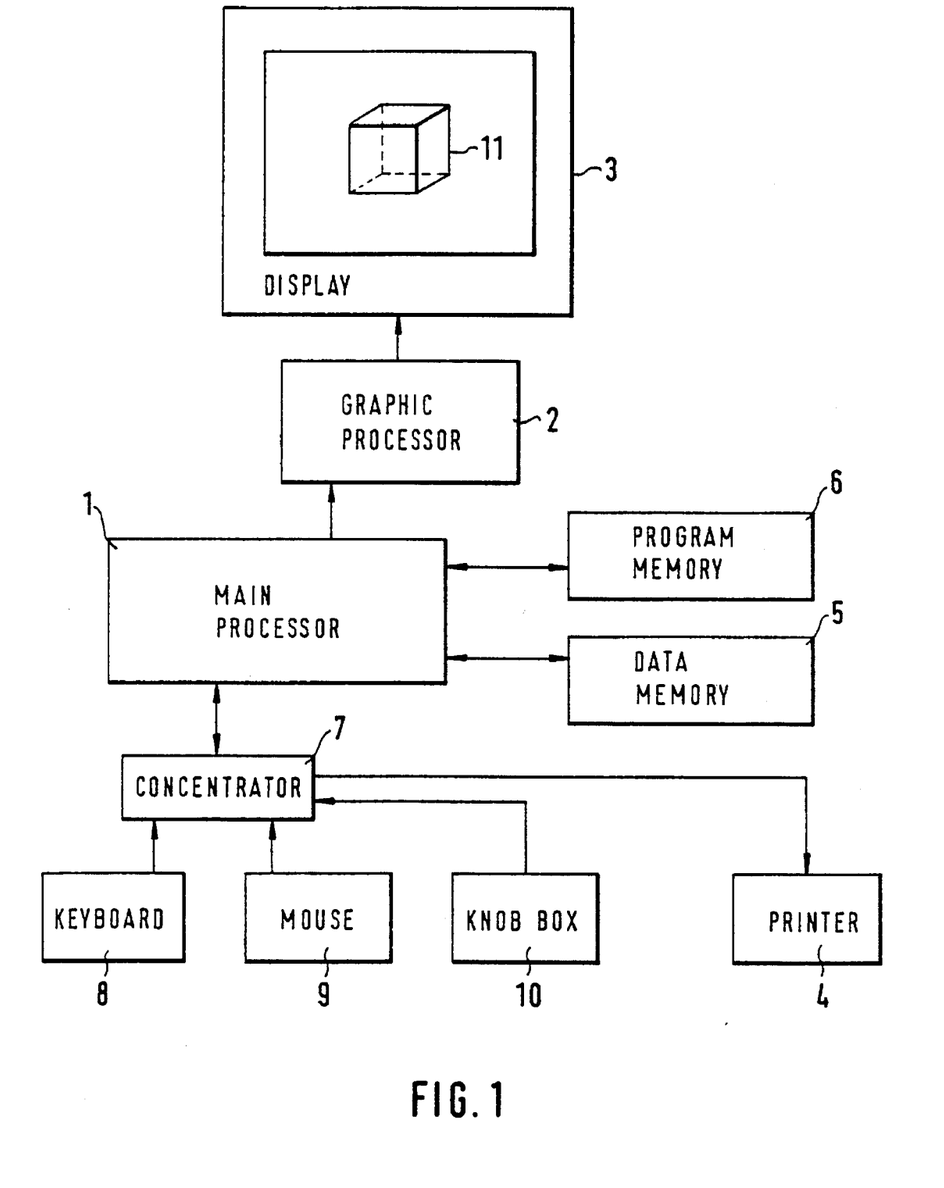
FIG. 1 schematically shows the components of a 3D CAD system incorporating the present invention.

FIG. 1 is a schematic diagram showing the typical components of a 3D CAD system. A main processor 1 is connected via a graphic processor 2 to a display screen 3, for example a CRT. The geometric object 11 under design is displayed on the screen 3. The main processor 1 performs the calculations for creating and modifying the geometric object displayed on the screen 3. A printer 4 is connected via a concentrator 7 to the main processor 1. The printer 4 can produce a hardcopy of the image displayed on the screen 3 or a hardcopy of geometric objects stored in the data memory 5 of the CAD system. The data memory 5 is connected to the main processor 1 and comprises a mass storage device such as a magnetic or an optical disk. A program memory 6 contains the instructions which are used in the creation and manipulation of the geometric object under design.

There are several input means which are available to the user for interaction with the CAD system. In the embodiment shown, there is a computer mouse 9 which controls a cursor displayed on the screen 3. Also displayed on the screen 3 is a command menu from which the user may select desired commands by positioning the cursor at the displayed option by appropriate movement of the mouse 9 and by pressing an activation key. An example of a displayed menu option is the addition or removal of certain parts from the object displayed on the screen, such as the application of a bore through the object. Another example of an option which can be selected is, in accordance with the present invention, the blending of certain edges of the displayed object. In addition to the mouse 9, a keyboard 8 is provided for entering commands or data into the processor 1. A further input means is a knob box 10 which comprises a plurality of knobs by means of which the object displayed on the screen 3 can be rotated around various axes and linearly shifted in specific directions. It is understood that instead of or in addition to the just described input means alternative input means can be provided, such as a graphics tablet or a light pen. What is only important is that the input means give the user the possibility to modify the object displayed on the screen 3 in a desired way, and especially to define those parts of the displayed object where he wants to make modifications, such as blending of edges.

In accordance with an embodiment of the invention, the blending of edges is performed in the following way: First, the user selects the edge which he wants to be blended by positioning the cursor on the corresponding edge of the object displayed on the screen 3 and by pressing an activation key of the mouse 9. In response thereto, the CAD system causes the edge to be displayed in a colour which is different to the other colours of the object. This colour change indicates to the user that the edge has actually been selected for blending by the CAD system. In the next step, the user has to enter into the CAD system which blending radius he wishes. The desired value is entered via the keyboard 8. Thereafter, the processor 1 performs the necessary calculations to generate the modified object. Details of the procedure for generating the modified object will be explained below. Once the object with the blended edge has been generated by the processor, it is displayed on the screen 3.

A condition which has to be fulfilled in producing the rounding off of a selected edge is that the rounded portion and the face of the original object which meets the rounded portion have the same tangent at the area where they meet. In other words, there is a smooth transition between the rounded portion and the face of the object on which this portion borders. The invention is not limited to blending with a constant radius, but it can also be used when the rounded portion has variable radius. In particular, the surface of the rounded portion need not be a cylinder surface.

A similar procedure as with the just described rounding off of an edge applies for chamfering. First, the user selects the edge to be chamfered and the edge is then marked by the CAD system by suitable colouring. Then, the user enters via the keyboard 8 a distance value corresponding to the desired chamfer. The processor 1 then calculates the new object with the desired chamfer and displays it on the screen 3.

In the following, an embodiment of the method of the invention will be described in detail with reference to flow charts. Thereafter, for illustration of the method described in the flow charts, specific examples for blending edges of a geometric object will be described with reference to graphical models of these objects. In the following description, it is assumed that the internal representation of the object in the computer is a "boundary representation". The internal representation of the object means the technique used by the computer to structure the data that comprise the object. Specifically, the term boundary representation means that the object is represented by its external surfaces and edges. The boundary representation is a model of the skin of the object which distinguishes between topology and geometry. The topology defines the connections between the various vertices, edges and faces of the object irrespective of the actual shape and magnitude. The geometry defines the actual shapes and magnitudes, for example the shapes of the outer faces of the object, whether they are flat faces, cylinder faces, spherical faces or any other curved faces. The technique of boundary representation as such is known, for example from the above mentioned article by Braid.

The following examples make use of a boundary representation with "winged edge" data structure. The winged edge structure is a refinement of the boundary representation wherein the topological elements like vertices, edges and faces are given an orientation. Details of the winged edge structure are described in the article by Braid (see section 2.2). For the explanation of the method of the invention, it is still necessary to introduce the known Euler operations "kev" and "kbfv". The operation "kev" (kill edge vertex) removes an edge and a vertex from the object under design, and the operation "kbfv" (kill object face vertex) removes an edge, a face and a vertex. Both operations are also explained in the article by Braid in section 3.3.

Figure 2:
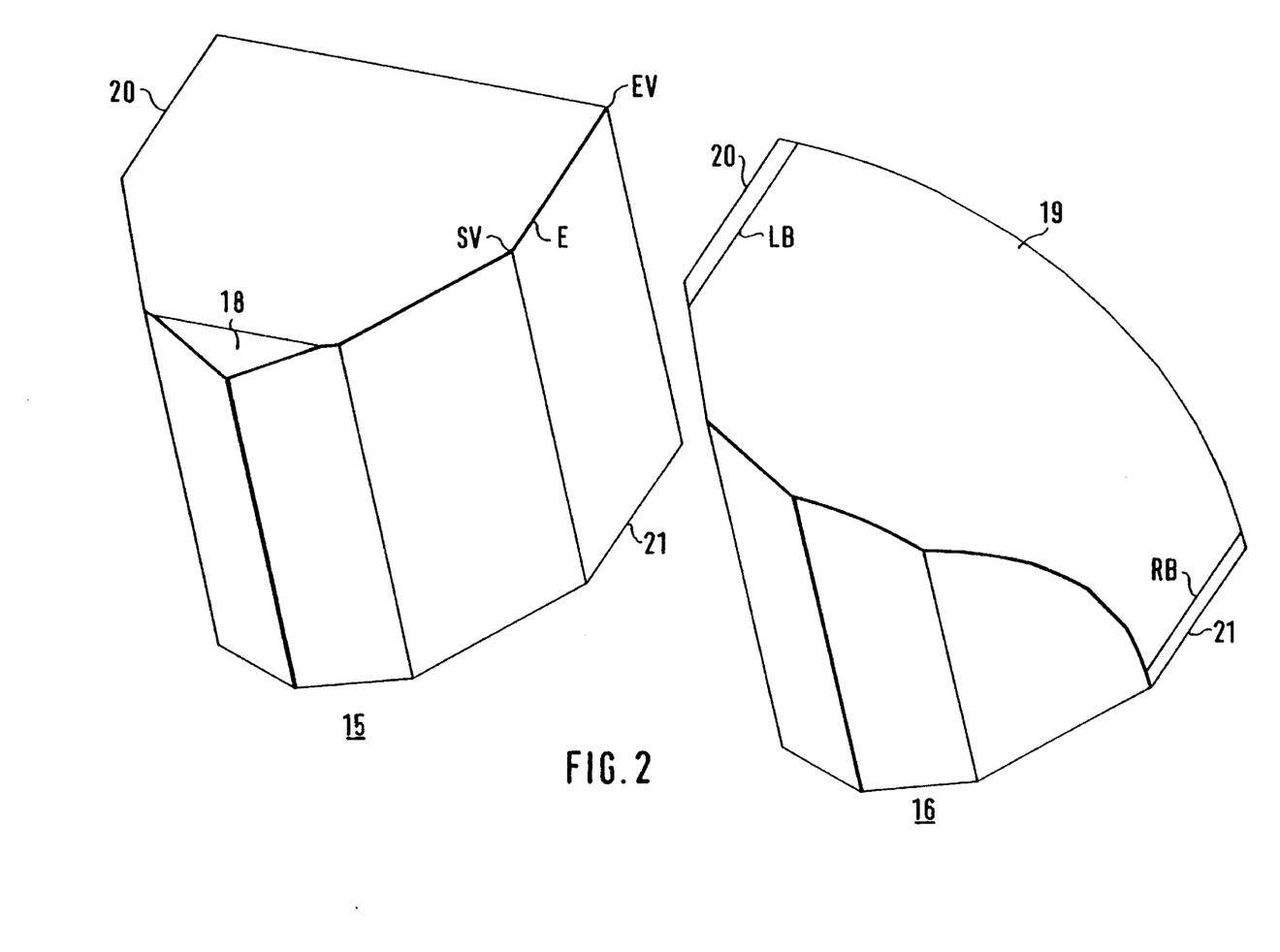
FIG. 2 shows a geometric object before and after blending an edge in order to illustrate the method of the invention.

Before describing the method of the invention with flow charts, reference is made to FIG. 2, which serves for explaining some of the terms which will subsequently be used. FIG. 2 shows a geometric object 15 before blending and the same object after blending (reference numeral 16). It is assumed that the edge E of the object 15 is to be blended with a radius selected by the user. The radius is so large that the entire face 18 is removed by the blending operation. The blended object 16 comprises a curved blend portion 19. The blend portion 19 forms a part of the blend surface. The blend surface generally describes which shape the blending should have, for example the shape of a cylinder surface. The blend surface will subsequently be denoted with BS. In the blended object 16, two new edges LB and RB have been created which will subsequently be denoted as left and right boundary, respectively. The original edges 20 and 21 of the object 15 are still present in the blended object 16. In the following, the two vertices of the edge E which is to be blended are denoted as start vertex (SV) and end vertex (EV), respectively.

Figure 3:
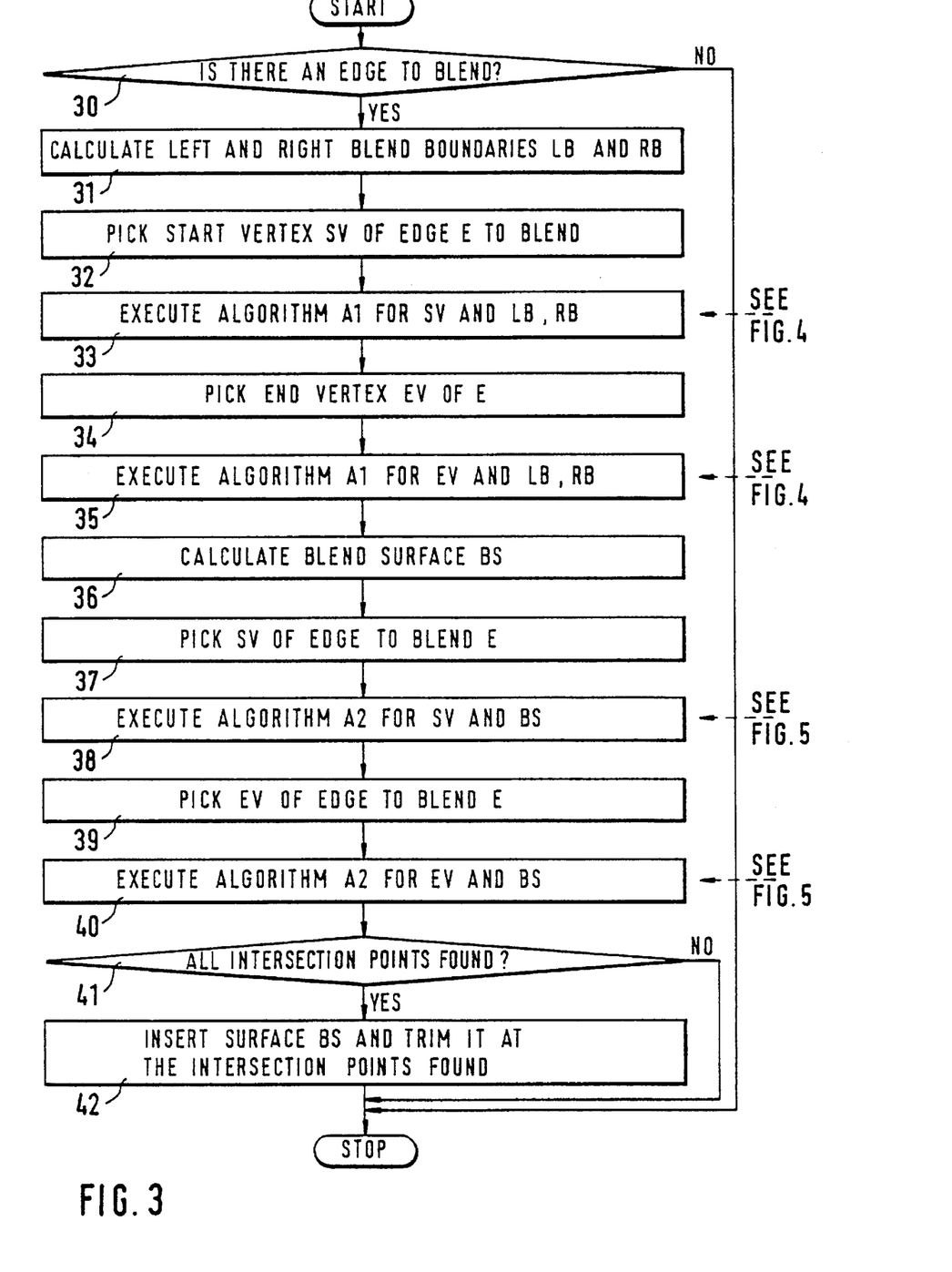
FIG. 3 is a flow chart which describes the overall algorithm of the invention for blending an edge of a geometric object.
Figure 4:
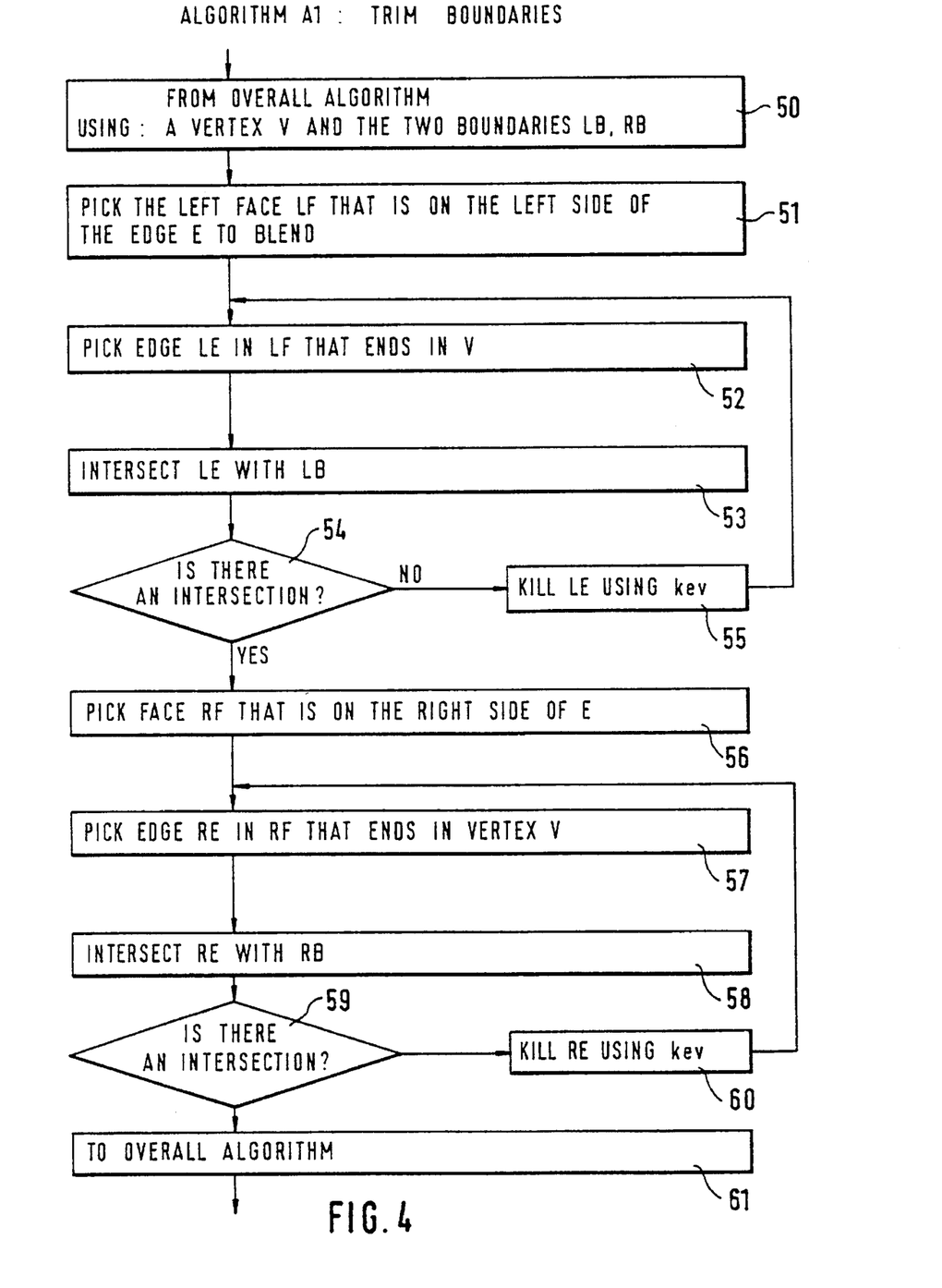
FIG. 4 is a flow chart describing a first sub-algorithm which is called during the execution of the overall algorithm described in FIG. 3.
Figure 5:
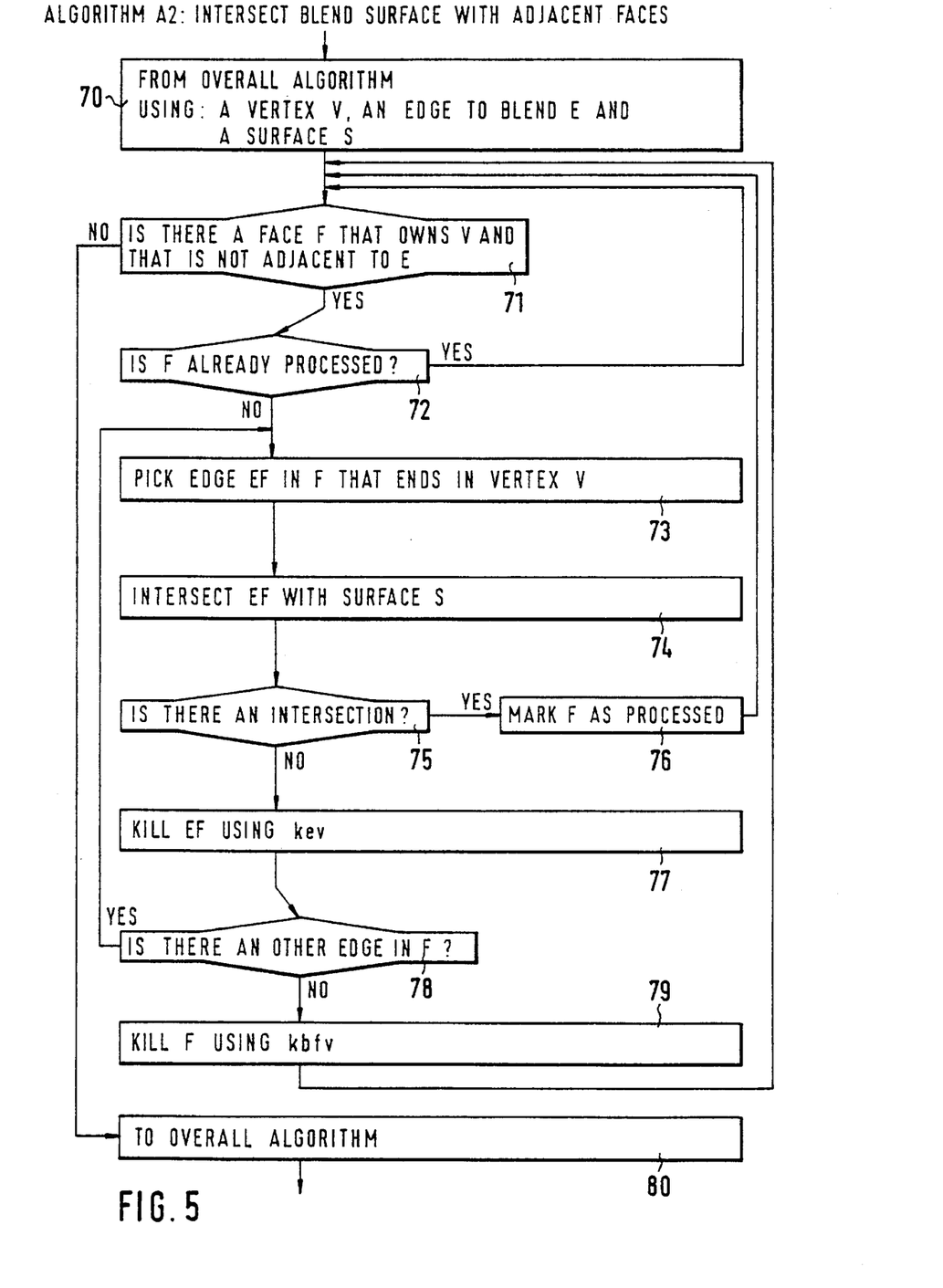
FIG. 5 is a flow chart describing a second sub-algorithm which is called during the execution of the overall algorithm described in FIG. 3.

Reference is now made to the flow charts in FIGS. 3, 4, and 5. FIG. 3 describes the overall algorithm for blending an edge E. During the execution of the algorithm, two sub-algorithms A1 and A2 are called. These sub-algorithms A1 and A2 are described in FIGS. 4 and 5, respectively. Assuming that an edge E is to be blended (block 30), the left and right blend boundaries LB and RB are first calculated as shown in block 31. This calculation is performed by determining the intersection of the desired blend surface with the geometric object. In the next step according to block 32, the start vertex SV of the edge E is selected and then the sub-algorithm A1 is executed for the start vertex SV as indicated in block 33. The purpose of the sub-algorithm A1 is to trim the boundaries by determining the intersections of the left and right boundary with certain edges of the geometric object. Details of the sub-algorithm A1 will be explained below. After execution of algorithm A1, the end vertex EV of the edge E is picked according to block 34 and then, in block 35, the sub-algorithm A1 is executed again, now using EV as input parameter. As the result of the two-fold execution of the sub-algorithm A1, four intersection points between the boundaries LB and RB on the one hand and four edges starting at the edge E on the other hand have been generated.

In the next step according to block 36, the blend surface BS is calculated. Then the start vertex SV of the edge E is picked (block 37) and the sub-algorithm A2 is executed with SV and BS as input parameters as shown in block 38. The purpose of the sub-algorithm A2 is to intersect the blend surface BS with adjacent faces. Details of the sub-algorithm A2 will be explained below. After the sub-algorithm A2 has been performed for EV and BS, the end vertex EV is picked (block 39) and the sub-algorithm A2 is executed with EV and BS as input parameters (block 40). Thereafter, it is checked according to block 41 if all intersection points have been found. This check is simply performed by counting the found intersection points since the total number to be expected is known. If all intersection points have been found, the blend surface BS is inserted and it is trimmed at the intersection points which have previously been found (block 42). Now, the object with the blended edge has been created and it is displayed on the screen 3.

In the following, the sub-algorithm A1 will be explained in more detail with reference to FIG. 4. The input parameters are, as shown in block 50, a vertex V and the two boundaries LB and RB. The vertex V may be the start vertex SV or the end vertex EV. According to block 51, the first step is to pick the face LF which is on the left side of the edge E which is to be blended. Then, in block 52, the edge LE is picked which is in the face LF and which ends in the vertex V. The edge LE is then intersected with the left boundary LB as shown in block 53. In block 54, it is checked if there is actually an intersection. If there is no intersection, the edge LE is removed from the object (block 55). The removal of the edge is performed by means of the above explained Euler operation "kev". After removal of the edge, the algorithm returns to block 52. The removal of edges is repeated until an intersection has been found. If an intersection has been found, a similar procedure as the one just described for the left side is performed for the right side. According to block 56, the face RF on the right side of the edge E is picked, then the edge RE is picked which is in RF and which ends in the vertex V (block 57). According to block 58, an intersection between RE and the right boundary RB is performed. If it turns out in block 59 that there is no intersection, the edge RE is removed (block 60), again using the Euler operation "kev", and the algorithm returns to block 57. The removal of edges is repeated until an intersection has been found. Once an intersection has been found, there is a return (block 61) to the overall algorithm shown in FIG. 3. This return is either to block 33 or 35 depending from which of the two blocks the sub-algorithm started.

In the following, the sub-algorithm A2 will be explained in more detail with reference to FIG. 5. As shown in block 70, the input parameters for this sub-algorithm are a vertex V (either SV or EV), the edge E to be blended and a surface S. In block 71, it is checked if there is a face F that owns the vertex V and that is not adjacent to the edge E. If this is not the case, it is jumped back to the overall algorithm as indicated in block 80. If there is such a face F, it is checked in block 72 if the face F has already been processed. If F is the first face picked in the sub-algorithm A2, the answer is of course "no" and the next step would be that according to block 73. If the face F has already been processed, the next face is checked according to block 71. For a face F which has not been processed, the edge EF is picked which lies in F and which ends in vertex V (block 73). Then this edge EF is intersected with the surface S as indicated in block 74. If there actually exists an intersection (block 75), the face F is marked as "processed" as indicated in block 76 and the algorithm jumps back to block 71. If there is no intersection, the edge EF is removed (block 77) using the Euler operation "kev". Thereafter, it is checked according to block 78 if there is another edge in F. If this is true, the algorithm jumps again to block 73. If there is no other edge, the face F is removed using the above mentioned Euler operation "kbfv". Then it continues with block 71. This loop is run through until there is no face that owns the vertex V (SV or EV) and that is not adjacent to the edge E.

It is understood that it is not a necessary feature of the above described algorithm that the start vertex (SV) is processed before the end vertex (EV) (see, for example, blocks 32 and 34) because the designation of a vertex as "start vertex" or "end vertex" is arbitrary. Similarly, it is not a necessary feature that the left side of the edge E is processed before the right side (see blocks 51 and 56). It could also be the other way round. What is only important is that the reversal of the order is kept consistently throughout the entire algorithm.

Figure 6A:
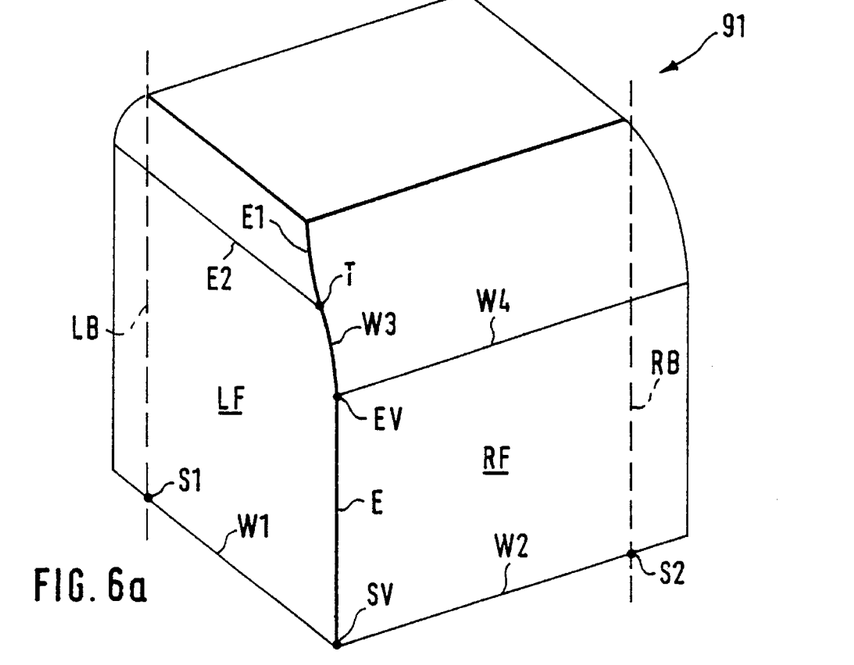
FIGS. 6a–e illustrate a first embodiment of the algorithm described in FIGS. 3–5 with reference to a first geometric object.

Subsequently, two examples for the algorithm described above will be explained with reference to actual geometric objects. The first example will be described with reference to FIGS. 6a–e. FIG. 6a shows a geometric object 91 whose edge E is to be blended. The start and end vertices of the edge E are SV and EV, respectively. In the first step of the algorithm, according to block 31 of the flow chart, the left boundary LB and the right boundary RB are calculated. These two boundaries are depicted in FIG. 6a with dotted lines. In the next step, according to block 32, the start vertex SV is picked, then the face LF is picked (block 51) and then the edge W1 ending in SV is picked (block 52). Now, W1 is intersected with LB (block 53). The result is the intersection S1. According to block 56, the right face RF is now picked and the edge W2 which starts from SV and which lies in RF is intersected with the right boundary RB. The result is the intersection $2. Thereafter, the analogous procedure which has been performed for the start vertex SV is performed for the end vertex EV (blocks 34,35).

Figure 6B:
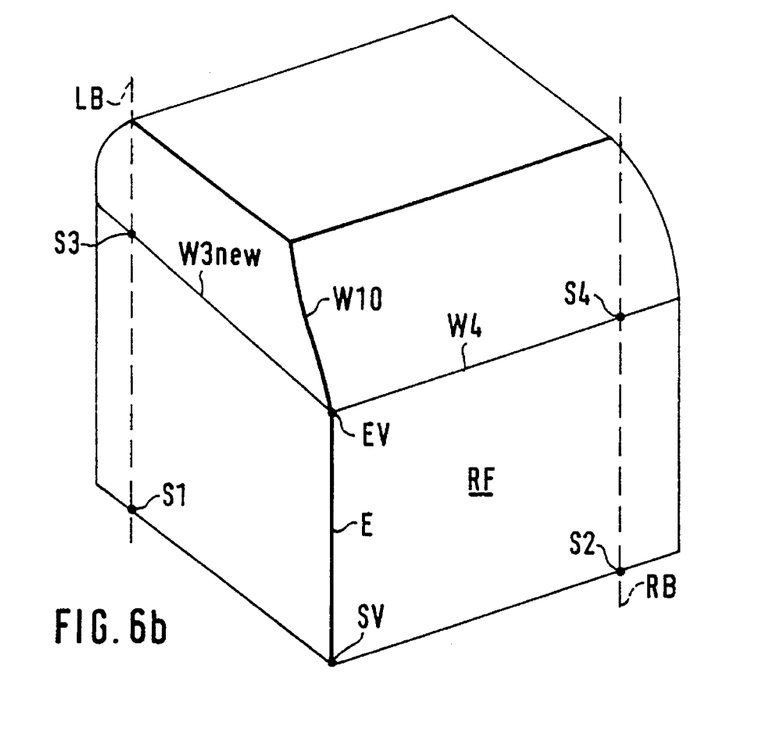

According to block 52, the edge W3 ending in EV is picked and then intersected with LB. Since there is no intersection, the edge W3 is removed from the object (block 55). The resulting topological object is shown in FIG. 6b. The object according to FIG. 6b is generated from the object in FIG. 6a by deleting the edge W3 and by "drawing" the vertex T to the vertex EV so that they coincide. This could be illustrated by comparing the edges E1 and E2 which end in T with elastic bands which, after deletion of W3, are connected to EV. After deletion of the edge W3, a new edge W3new ends in EV. The edge W3new is intersected with LB and now there is an intersection $3. Finally, the edge W4 is intersected with the right boundary RB resulting in the intersection $4.

After the four intersections S1, $2, $3 and $4 have been found, the algorithm continues with block 36 according to which the blend surface BS is calculated. Then the sub-algorithm A2 is executed for SV and for EV (blocks 38 and 40). Basically, the sub-algorithm A2 performs intersections of the blend surface BS with all edges which are connected to SV or EV and which have not yet been intersected. In the present example, this only applies to the edge W10 which is connected to EV. In the present example, it is also assumed that there is no intersection between the blend surface and the edge W10.

For calculating the intersection between the blend surface and a specific edge of the object, the actual geometric shapes of the blend surface and of the specific edge are used. The results of the intersection are specified points in the three-dimensional space. In the example shown in FIG. 6b, the edge W10 corresponds to the edge E1 of the original object. Thus, for calculating the intersection between W10 and the blend surface, the actual arrangement in space of the original edge E1 from which W10 originates is used.

Figure 6C:
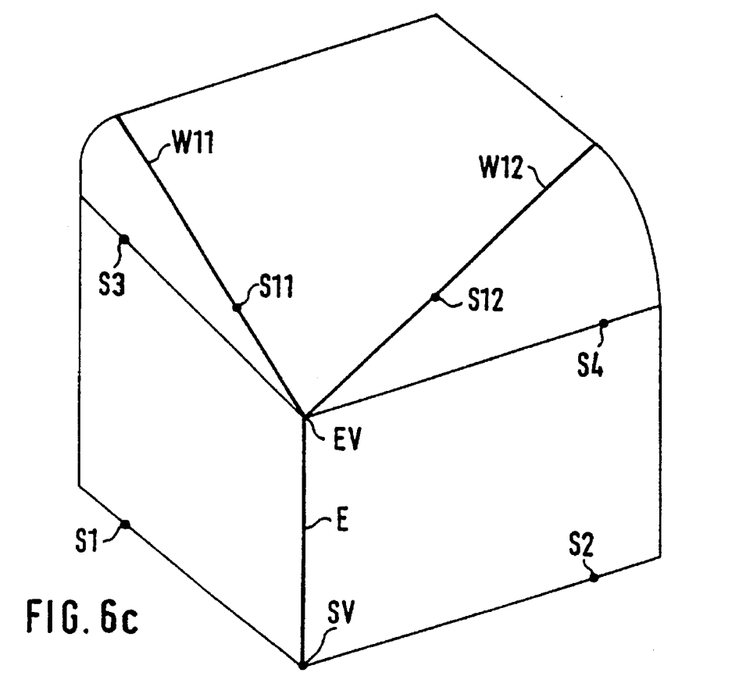
Figure 6D:
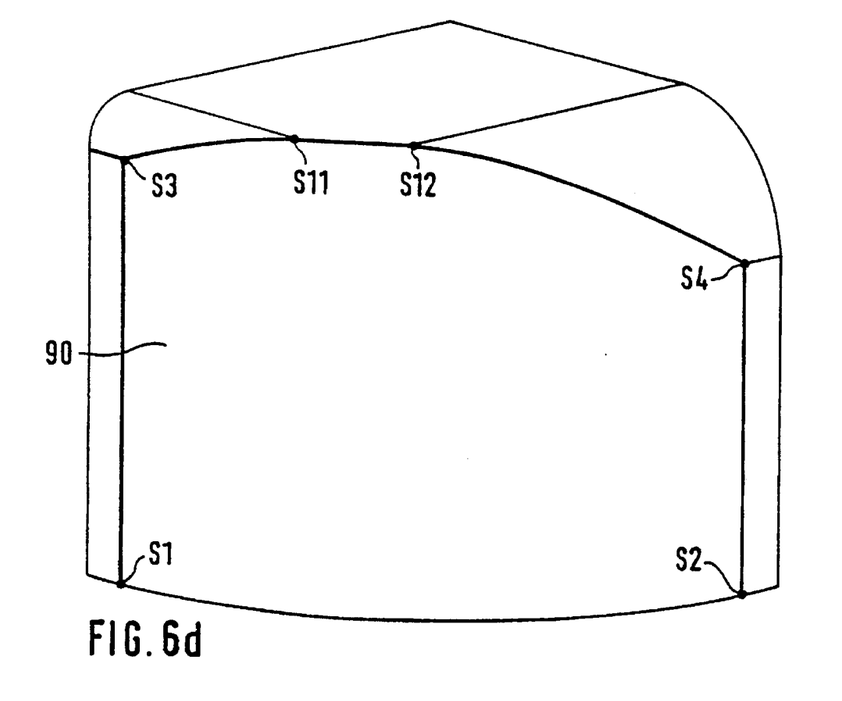
Figure 6E:
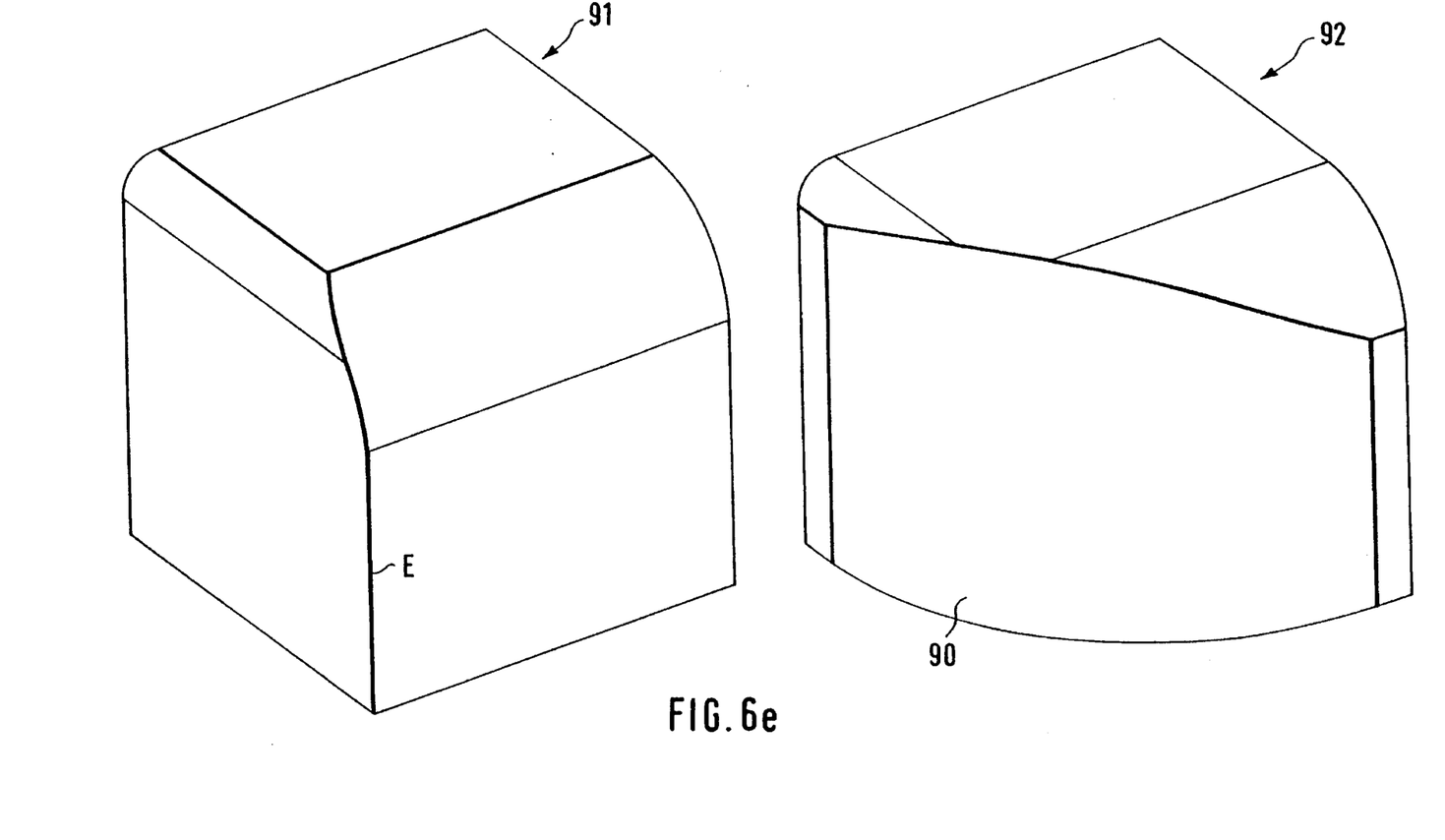

Since there is no intersection between W10 and BS in the present example, the edge W10 is removed, in accordance with block 77. The result is the topological model shown in FIG. 6c. There are two edges W11 and W12 which are connected to EV. Both edges are intersected with BS. The intersections are S11 and S12. Thus, all intersections between the object and the blend surface have been found. In the final step according to block 42, the blend face is inserted instead of the edge E and the intersections S1, S3, S11, S12, S4, and S2 are connected through edges. The final result is shown in FIG. 6d. The blended portion which replaces the original edge E is a curved convex face 90. FIG. 6e is a comparison between the original object 91 whose edge E is to be blended and the processed object 92 after the blending has been performed.

Figure 7A:
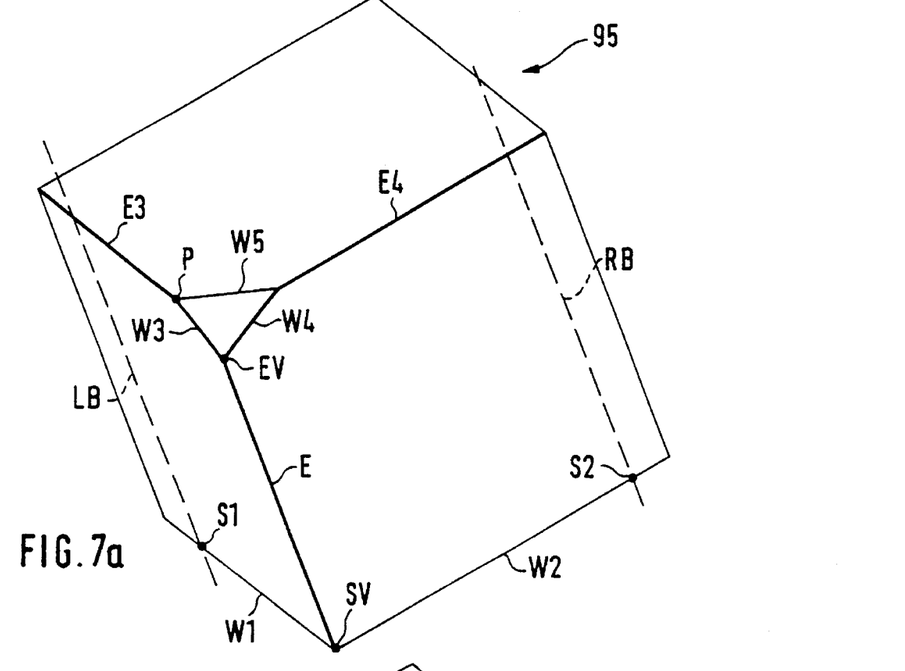
FIGS. 7a–f illustrate a second embodiment of the algorithm described in FIGS. 3–5 with reference to a second geometric object which is different to the first object.
Figure 7B:
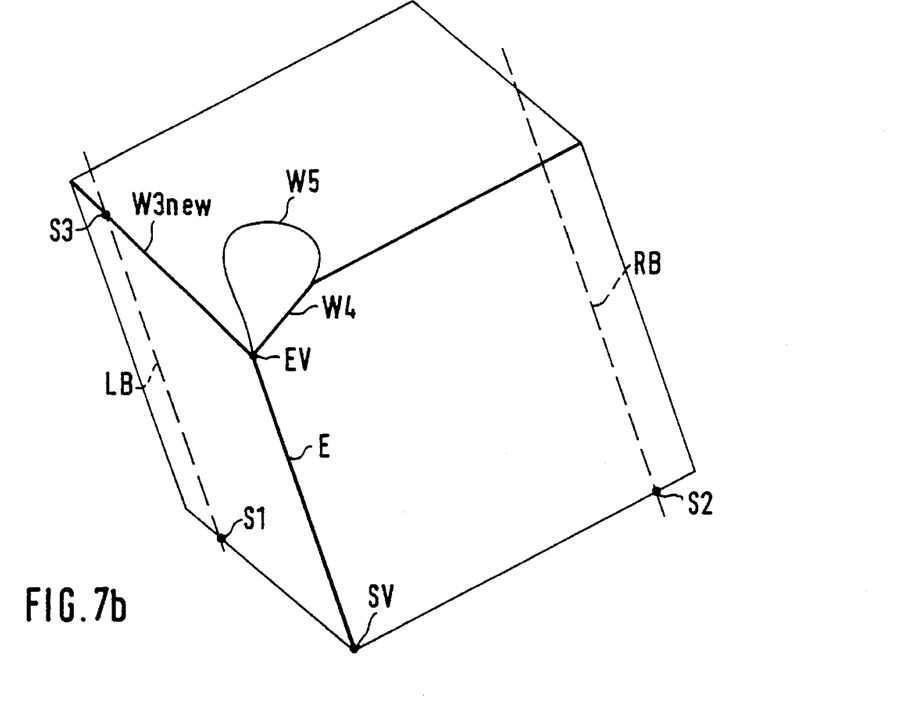
Figure 7C:
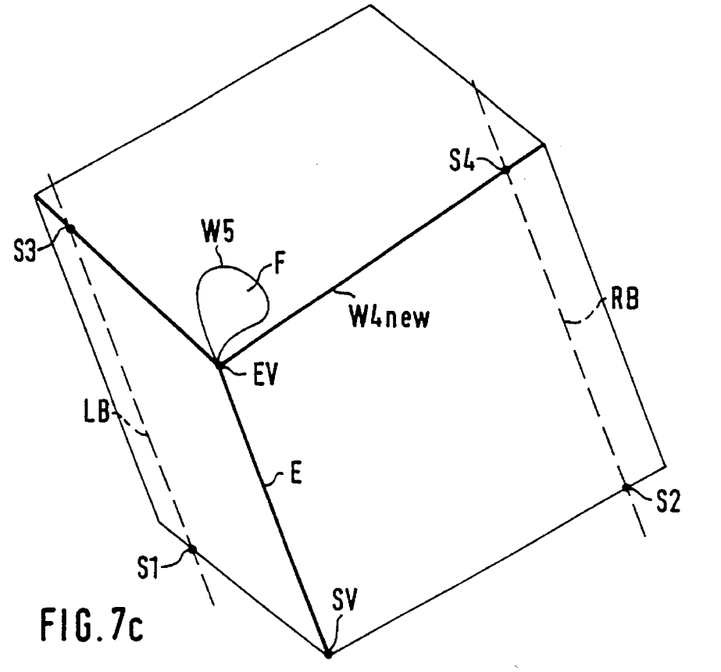

A second example for the algorithm described in the flow charts of FIGS. 3–5 will now be explained with reference to another geometric object. Reference is made to FIGS. 7a–f. The object 95 generally has the shape of a cube wherein a corner is cut off. The edge E is to be blended with a specific radius. First, the left and the right boundary LB and RB are calculated. Then, the sub-algorithm A1 is executed for the start vertex SV resulting in the two intersections S1 and S2 of the edges W1 and W2 with LB and RB, respectively. When executing A1 for the end vertex EV, the edge W3 has to be intersected with LB. Since there is no intersection, the edge W3 is removed using the Euler operation "kev" (block 55). The resulting topological model is shown in FIG. 7b. The transformation from FIG. 7a to FIG. 7b can be illustrated by assuming that W3 is deleted and that the vertex P is moved onto the vertex EV whereby the edges connected to P move together with P, similar to elastic bands. In the next step, the left boundary LB is intersected with the edge W3new which corresponds to the edge E3 of the original object. The result is the intersection S3. Then the edge W4 is intersected with the right boundary RB. Since there is no intersection, W4 is removed according to block 55. The resulting topological model is shown in FIG. 7c. The edge W4new which corresponds to the edge E4 of the original object and which is connected to SV has the intersection S4 with RB. Thus, the necessary four intersections S1, S2, S3, and S4 have been found.

Figure 7D:
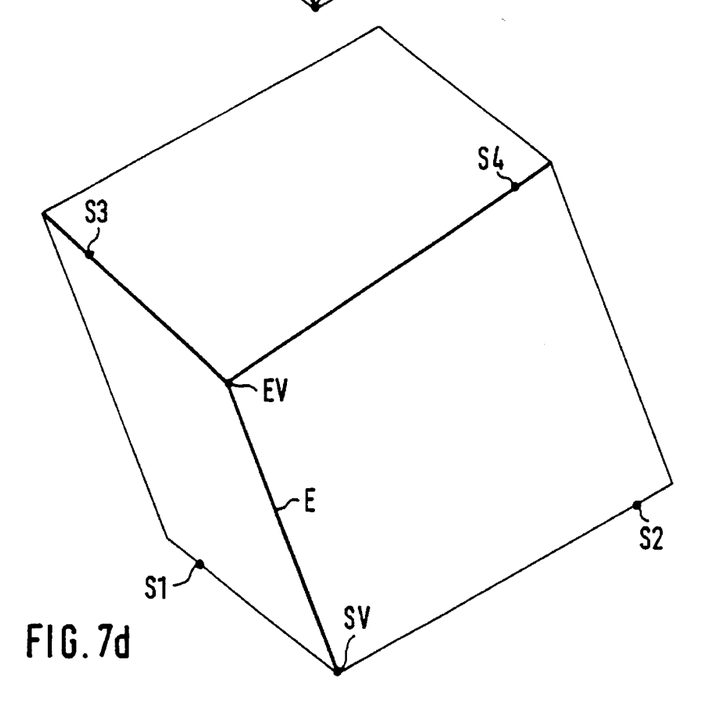
Figure 7E:
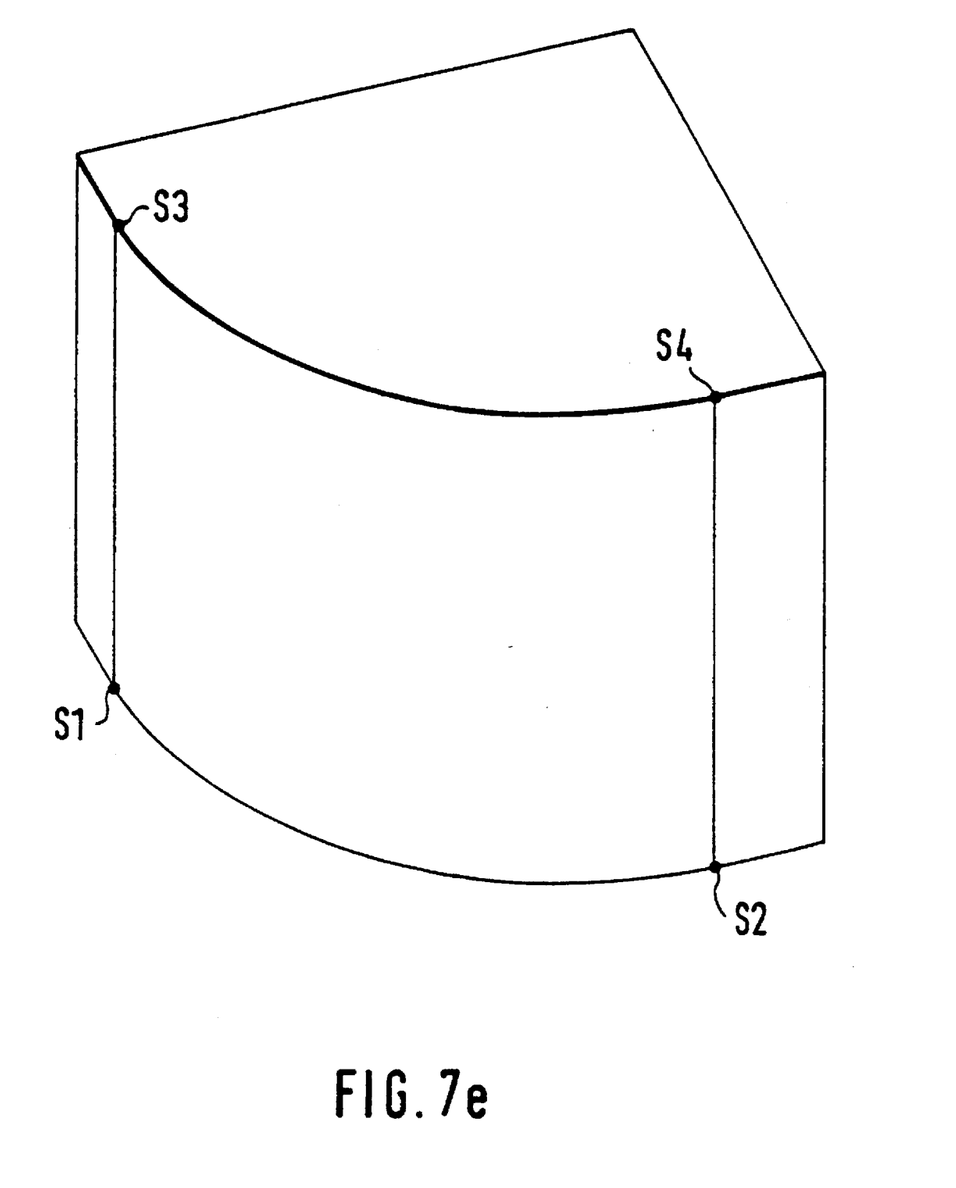
Figure 7F:
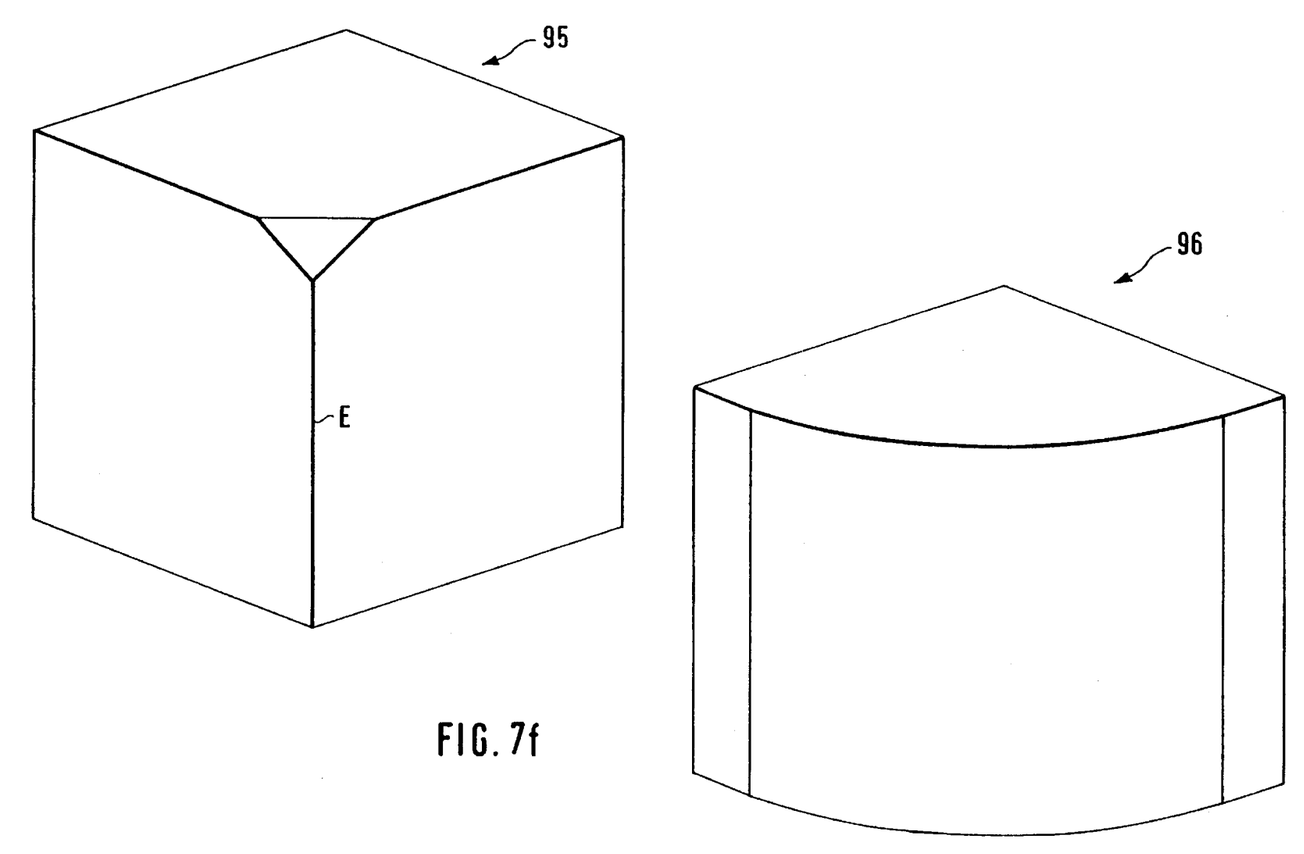

The procedure continues with the calculation of the blend surface (block 36). The blend surface is intersected with W5. As already explained with reference to the first example (FIGS. 6a–6e), the calculation uses the actual geometric position in space of the edge W5, as shown in FIG. 7a. In this specific example, it is assumed that there is no intersection. Since W5 was the last edge of its corresponding face F, the entire face F is removed from the topological model using the Euler operation "kbfv", in accordance with block 79 of the flow chart. The result is the topological model of FIG. 7d. There are no further edges starting from SV or EV. Consequently, all intersections which are necessary to insert the blend face have been found. In the final step, the blend face is inserted instead of the edge E and the points S1, S3, S4, and S2 are connected through edges. The resulting blended object is shown in FIG. 7e. For illustration, FIG. 7f shows a comparison between the original object 95 whose edge E is to be blended and the resulting blended object 96.

The blending method of the invention cannot only be used for blending with a constant radius. It is also possible to perform blending with variable radius: For example, the blending radius could continuously vary from the start vertex to the end vertex of the edge to be blended. Since the above described method does not make any assumptions about the specific shape of the blend surface, one could in principle use any type of blend surface. In particular, the invention also permits to perform chamfering.

Figure 8:
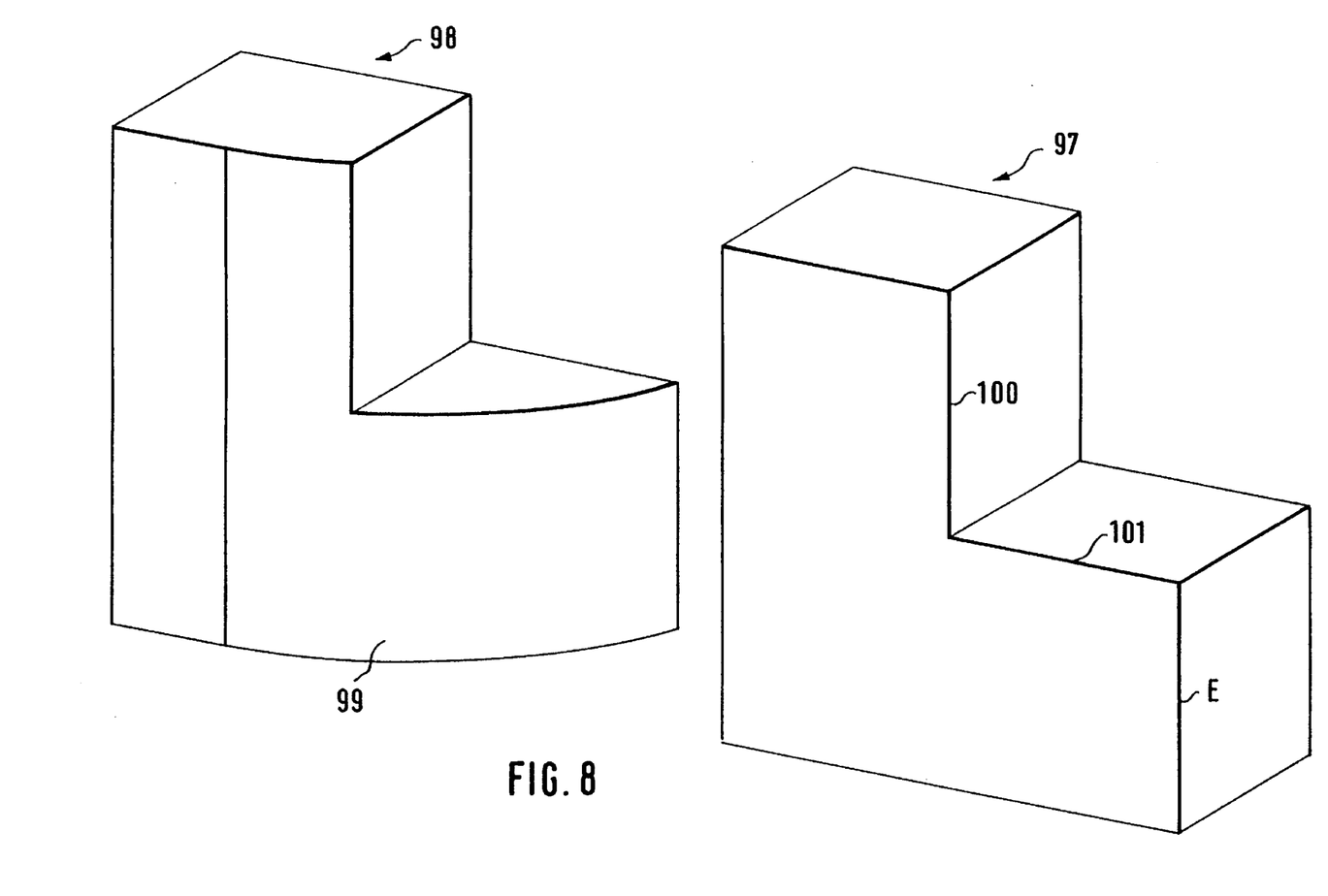
FIG. 8 shows a further geometric object before and after blending a specific edge of the object in order to further illustrate the method of the invention.

An additional example illustrating the capabilities of the method of the invention is shown in FIG. 8. An object 97 is shown whose edge E is to be rounded. The object resulting from the blending process is object 98. The blend radius in this example is selected so large that the edges 100 and 101 of the original object 97 disappear. The rounded portion is labelled with reference numeral 99. Prior art CAD systems are not capable of performing this operation, they just issue an error message. With the present invention, the operation can be performed without problem even if several edges have to be deleted. There is no limitation in the present invention regarding the number of edges and faces which have to be deleted. According to the invention, just as many edges and faces are deleted as is necessary for performing the desired blending operation.

What is claimed is:

1. A method for blending edges of a geometric object in a computer-aided design system, comprising the steps of:

a) selecting an edge to blend, said edge having a start vertex and an end vertex, b) selecting a blend surface, c) determining blend surface boundaries, d) deriving intersections of the blend surface boundaries with edges of the geometric object connected to the start vertex or to the end vertex, e) deleting edges for which step d) does not provide an intersection, f) deriving intersections of the blend surface boundaries and a new edge which has been created by the deletion and which is connected to the start vertex or to the end vertex, g) deleting edges for which step f) does not provide an intersection, and repeating step f) with a new edge which has been created by the deletion and which is connected to the start vertex or to the end vertex, h) determining the blend surface geometry, i) deriving intersections of the blend surface geometry with any further edges which are connected to the start vertex or to the end vertex and which have not yet been intersected, j) inserting between the intersections derived in the previous steps, a corresponding portion of the blend surface geometry, and k) displaying the resulting geometric object.

2. A method as recited in claim 1, wherein step i) comprises:

deleting edges and corresponding faces which are made external to the geometric object by the blend surface geometry and have no intersection with the blend surface.

3. A method as recited in claim 1, wherein the deletion of edges is performed by the Euler operation "kill edge vertex" and the deletion of faces is performed by the Euler operation "kill object face vertex".

4. A method as recited in claim 1, wherein the blend surface has a variable radius.

5. A method as recited in claim 1, wherein the blend surface is a chamfer.

6. A computer-aided design system, comprising:

input means for entering commands and data for creating and modifying a geometric object;

memory means for storing a representation of the geometric object and for storing instructions relating to the creation and modification of the geometric object;

display means for displaying the geometric object and for displaying an edge to blend which has been selected by a user and for displaying the blended object; and processing means including means for creating and modifying the geometric object by blending edges of the geometric object, said means for creating and modifying selecting an edge of said geometric object to blend, said edge having a start vertex and an end vertex; selecting a blend surface configuration; determining blend surface boundaries; deriving intersections of the blend surface boundaries with edges of the geometric object connected to the start vertex or to the end vertex; deleting edges for which no intersection is found and repeating said deriving intersections operation for any new edge created by the deleting action and which edge is connected to the start vertex or to the end vertex; determining a blend surface geometry; deriving intersections of the blend surface geometry with edges which are connected to the start vertex or to the end vertex and which have not yet been intersected; inserting between derived intersections, a portion of the blend surface geometry which lies therebetween; and causing said display means to display a resulting geometric object.

* * * * *